United States Patent
Cheng et al.

(10) Patent No.: US 12,167,816 B2
(45) Date of Patent: Dec. 17, 2024

(54) CONTROL OF A PORTABLE FOOD PROCESSING APPARATUS

(71) Applicant: KONINKLIJKE PHILIPS N.V., Eindhoven (NL)

(72) Inventors: Wing Kee Cheng, Eindhoven (NL); Dennis Lai, Eindhoven (NL); Samuel Agustin Cuaresma, Jr., Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 251 days.

(21) Appl. No.: 17/917,502

(22) PCT Filed: Apr. 6, 2021

(86) PCT No.: PCT/EP2021/058972
§ 371 (c)(1),
(2) Date: Oct. 6, 2022

(87) PCT Pub. No.: WO2021/204824
PCT Pub. Date: Oct. 14, 2021

(65) Prior Publication Data
US 2023/0146115 A1    May 11, 2023

(30) Foreign Application Priority Data

Apr. 7, 2020 (EP) .................... 20168377

(51) Int. Cl.
*A47J 43/08* (2006.01)
*A47J 43/046* (2006.01)
*A47J 43/07* (2006.01)

(52) U.S. Cl.
CPC .......... *A47J 43/085* (2013.01); *A47J 43/046* (2013.01); *A47J 43/0761* (2013.01)

(58) Field of Classification Search
None
See application file for complete search history.

(56) References Cited

U.S. PATENT DOCUMENTS 10,399,050 B1 * 9/2019 Bertsch ................ A47J 43/042
2016/0309960 A1 * 10/2016 Kolar .................. A47J 43/0761
(Continued)

FOREIGN PATENT DOCUMENTS

WO      2015162421 A1     10/2015
WO      WO-2016145430 A1 *  9/2016   ............ A47J 36/321

OTHER PUBLICATIONS

Extended European Search Report issued in connection with corresponding EP Application No. 20168377.8 dated Sep. 22, 2020.

*Primary Examiner* — Bobby Yeonjin Kim
(74) *Attorney, Agent, or Firm* — Maschoff Brennan

(57) ABSTRACT

A portable food processing apparatus describes a food processing chamber including a blade arrangement and a housing including a motor for driving said blade arrangement, a microcontroller for controlling said motor and at least one motion sensor communicatively coupled to said microcontroller. The microcontroller is adapted to evaluate sensor data produced by the at least one motion sensor in order to detect a predefined motion pattern in said sensor data, said predefined motion pattern corresponding to an operation setting of the motor; and control said motor in accordance with said operation setting upon detection of the predefined motion pattern.

17 Claims, 6 Drawing Sheets

(56) References Cited

U.S. PATENT DOCUMENTS

| | | |
|---|---|---|
| 2018/0059790 A1 | 3/2018 | Kolar et al. |
| 2018/0199761 A1 | 7/2018 | Gogorza Segurola et al. |
| 2018/0279664 A1* | 10/2018 | Shoham .................. A23N 1/02 |
| 2019/0001288 A1* | 1/2019 | Ciepiel ............... B01F 35/2117 |
| 2021/0298530 A1* | 9/2021 | Staun ...................... A47J 43/06 |

* cited by examiner

CONTROL OF A PORTABLE FOOD PROCESSING APPARATUS

CROSS-REFERENCE TO RELATED APPLICATIONS

The present application is a U.S. National Phase application under 35 U.S.C. § 371 of International Application No. PCT/EP2021/058972, filed on Apr. 6, 2021, which claims the benefit of European Patent Application No. 20168377.8, filed on Apr. 7, 2020. This application is hereby incorporated by reference herein.

FIELD OF THE INVENTION

The present invention relates to a portable food processing apparatus comprising a food processing chamber including a blade arrangement and a housing comprising a motor for driving said blade arrangement and a microcontroller for controlling said motor.

BACKGROUND OF THE INVENTION

Food processor apparatuses such as blenders, juicers and the like are typically operated by physical user interfaces comprising buttons, knobs, dials, and so on, with users familiarizing themselves with the operating instructions of such food processor apparatuses involving operations or sequences of operations of such user interfaces. Although such user interfaces are well-established, they nevertheless have a number of drawbacks. Firstly, such physical user interfaces require mechanical integration into the food processor apparatuses, which becomes increasingly difficult with decreasing size of the food processing apparatus. Secondly, many users struggle to remember how to operate such food processing apparatuses, in particular where such operations involve a sequence of interactions with the user interfaces of such food processing apparatuses.

These drawbacks become particularly prevalent in the field of portable food processing apparatuses, such as portable blenders or the like. Such portable apparatuses are typically relatively small, which makes mechanical integration of a physical user interface more complicated and costly. In particular, where the portable food processor has a rich functionality, several dials, buttons or the like may need to be mechanically integrated into the industrial design of the portable food processor, thereby limiting the flexibility of its industrial design and increasing the complexity of its assembly and its cost.

US 2018/0199761 A1 discloses a cooking appliance for processing food, more specifically a cooking appliance of the type that includes a body housing an electric motor, a shaft for actuating a processing tool, and an integral handle, the various processing tools being coupled to the body by means of an arm that comprises an implement, such as a grinding, whisking or mixing implement, where the operating control of the appliance (on, off, rotating speed of the implement, etc.) is carried out by means of a sensor system that can detect a characteristic or predetermined movement performed on the appliance and can interpret said movement as an operating instruction, for example, turning the implement on, turning it off, and establishing and controlling the rotating speed thereof, etc.

A cooking appliance incorporating such predetermined movement detection makes it easier for its user to operate the appliance, for example by obviating the need to use both hands to invoke certain functions of the cooking appliance.

As an example of such a predetermined movement, the user may turn his or her wrist clockwise or anti-clockwise whilst holding the cooking appliance in a vertical location as a start-up command for the motor of the cooking appliance.

Although incorporation of such predetermined movement detection on a cooking appliance or a food processing apparatus may reduce the number of physical user interface elements required, it still has some drawbacks. For example, during its use, a user may inadvertently make a movement with the cooking appliance that is recognised as a predetermined movement, which may lead to the undesired triggering of a (change of) operating function of the cooking appliance. In addition, where a number of functions are to be triggered by such predetermined movement detection, the user still has to memorise the different movements, or repeat a particular movement a number of times in order to achieve the desired operating mode of the cooking appliance, e.g. to implement incremental changes to an operating mode such as a speed setting.

SUMMARY OF THE INVENTION

The present invention seeks to provide a portable food processing apparatus with improved motion control.

According to an aspect, there is provided a portable food processing apparatus comprising a food processing chamber including a blade arrangement and a housing comprising a motor for driving said blade arrangement, a microcontroller for controlling said motor and at least one motion sensor communicatively coupled to said microcontroller, wherein the microcontroller is adapted to evaluate sensor data produced by the at least one motion sensor in order to detect a predefined motion pattern in said sensor data, said predefined motion pattern corresponding to an operation setting of the motor; and control said motor in accordance with said operation setting upon detection of the predefined motion pattern.

By using motion patterns rather than single motions for the control of such a portable food processing apparatus, the risk of accidental activation of a particular operation setting such as a mode of operation of the portable food processing apparatus is avoided or at least greatly reduced. Moreover, the recognition of motion patterns offers an extra dimension or parameter to the motion control of the portable food processing apparatus, as not only a particular type of motion pattern may be recognized, but in addition, variations within the pattern may be used as a control mechanism.

For example, in an advantageous embodiment, the microcontroller is adapted to determine an average acceleration or frequency of the detected predefined motion pattern within the evaluated sensor data, and wherein said operation setting is a function of the determined average acceleration or frequency. This allows a user to operate the portable food processing apparatus in a rather intuitive manner, for instance where the operation setting of the portable food processing apparatus scales with the detected average acceleration or frequency of the detected predefined motion pattern.

In an embodiment, the microcontroller is adapted to engage the motor for a predefined period of time in response to the detection of a predefined motion pattern corresponding to an activation command for said motor. This has the advantage that the user does not have to provide a separate termination command to avoid extended operation of the portable food processing apparatus, as well as ensures that the food within the portable food processing apparatus is processed for an appropriate duration. This furthermore provides a failsafe mechanism for accidentally triggering an operation setting of the portable food processing apparatus after it has been used for food processing, e.g. by motions of the portable food processing apparatus during transit, e.g. when carrying the portable food processing apparatus.

The predefined motion pattern corresponding to said activation command may be a repetitive shaking of the portable food processing apparatus, as this is a simple and intuitive motion pattern for triggering such motor engagement.

The microcontroller may be adapted to extend said predefined period of time upon detection of a predefined motion pattern corresponding to an activation extension command. This allows a user to extend the motor operation if necessary, e.g. in order to ensure that the food within the portable food processing apparatus is processed in accordance to the user's preference. The microcontroller may be adapted to limit the number of times said predefined period of time is extended upon detection of a predefined motion pattern corresponding to an activation extension command, e.g. to prevent depletion of a power source such as a battery of the portable food processing apparatus, prevent overheating of the portable food processing apparatus, and so on.

In an embodiment, the operation setting is the setting of a rotation speed or a rotation direction of the blade arrangement with said motor. In a further refinement, the microcontroller may be adapted to evaluate sensor data produced by the at least one motion sensor in order to detect a change in the tilt angle of the portable food processing apparatus in said sensor data and control the motor to adjust the rotation speed of the blade arrangement in accordance with the detected change in said tilt angle. This has the advantage that the user can control the rotation speed of the blade arrangement in a particularly fine-grained manner.

The microcontroller may be further adapted to determine a direction of travel of the portable food processing apparatus from sensor data received during operation of the blade arrangement; and control the motor to adjust the rotation speed of the blade arrangement in accordance with the determined direction of travel. This is particularly advantageous, as such a direction of travel typically has a bearing on the concentration of food around the blade arrangement; for instance, when moving upwards, food will be forced towards the blade arrangement, such that the rotation speed of the blade arrangement may be increased to maintain proper processing of the food, whereas when moving downwards, food will be forced away from the blade arrangement such that the rotation speed of the blade arrangement may be decreased to maintain proper processing of the food.

The microcontroller further may be adapted to control the motor to terminate operation of the blade arrangement in response to sensor data indicating a particular orientation or motion of the portable food processing apparatus for a defined duration of time. This allows the user to terminate the operation of the motor by placement of the portable food processing apparatus in the particular orientation, e.g. upside down, which can cause food to become separated from the blade arrangement, and/or provides a failsafe mechanism for when the portable food processing apparatus is being dropped, as the detection of the falling motion of the portable food processing apparatus triggers the termination of the blade arrangement.

The portable food processing apparatus preferably further comprises a battery arranged to power the at least one motion sensor, the microcontroller and the motor such that the portable food processing apparatus may be used when travelling, for instance.

Preferably, the at least one motion sensor comprises at least one of an accelerometer and a gyroscope.

In a particular embodiment, the portable food processing apparatus is a portable blender as such a portable blender is particularly suited to such user control based on motion pattern recognition, but the principles and teachings of the present invention may be applied to any suitable type of portable food processing apparatus.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
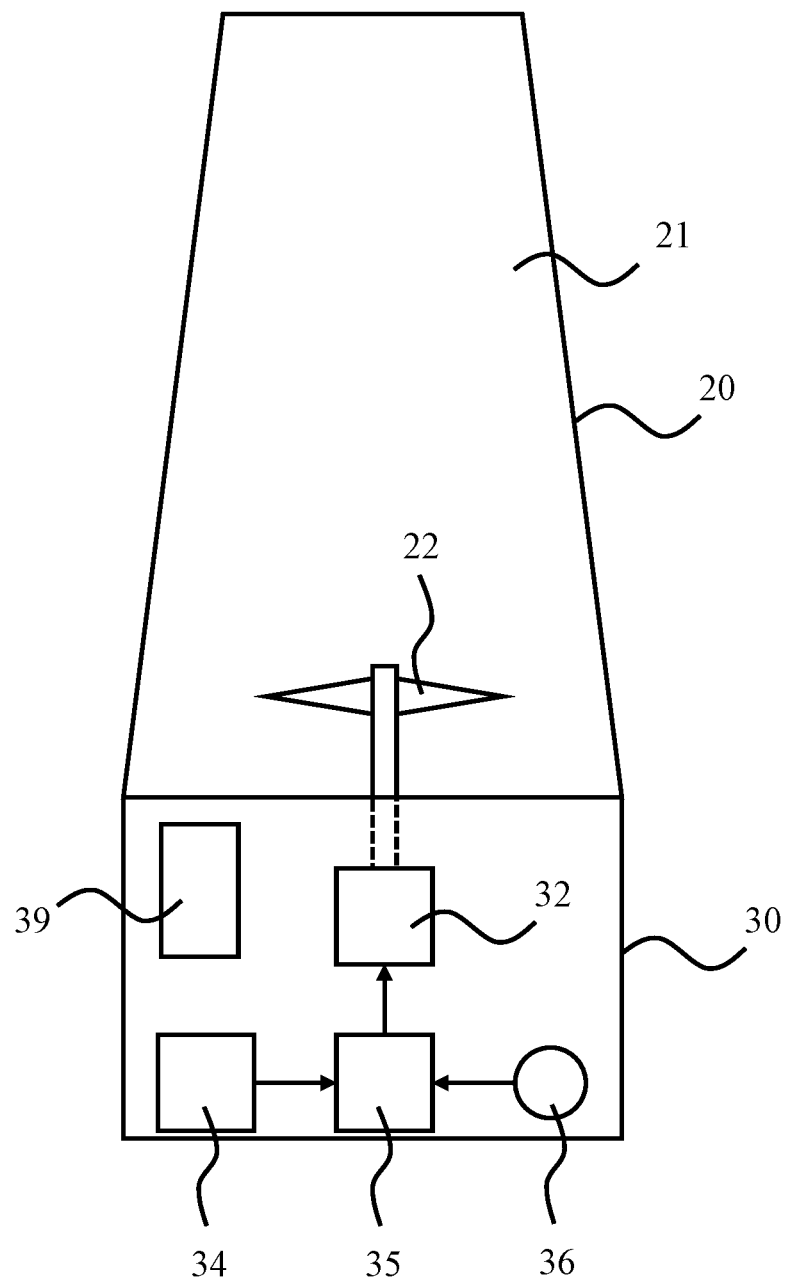
FIG. 1 schematically depicts a cross-sectional view of a portable food processing apparatus according to an embodiment.

It should be understood that the Figures are merely schematic and are not drawn to scale. It should also be understood that the same reference numerals are used throughout the Figures to indicate the same or similar parts.

FIG. 1 schematically depicts a cross-sectional view of a portable food processing apparatus 10, here a portable blender by way of non-limiting example. The portable food processing apparatus 10 comprises a container 20 detachably mounted on a housing 30 using any suitable mounting mechanism such as a thread fitting or bayonet fitting for example, which container 20 and housing 30 delimit a food processing chamber 21 of the portable food processing apparatus 10 when the container 20 is mounted on the housing 30. The container 20 and housing 30 may be made of any suitable material or combination of materials. For instance, the container 20 may be made of plastic and may be dishwasher safe, such that it can be cleaned in a dishwasher. A blade arrangement 22 extending from the housing 30 is mounted within the food processing chamber 21. The blade arrangement 22 may take any suitable shape, e.g. contain one or more cutting blades, and may be made of any suitable material or combination of materials.

The blade arrangement 22 is coupled to a motor 32 within the housing 30, e.g. through at least one of a drive axle, gear box, and so on, with the motor 32 being arranged to drive the blade arrangement 22. The motor 32 is controlled by a microcontroller 35 within the housing 30, which may take any suitable shape. As such microcontrollers are well known per se, this will not be further explained for the sake of brevity only. The housing 30 further comprises a motion sensor arrangement 34 communicatively coupled to the microcontroller 35. The motion sensor arrangement 34 may comprise at least one of an accelerometer and a gyroscope, and in some embodiments may comprise both such an accelerometer and gyroscope. As will be explained in further detail below, the microcontroller 35 is adapted to control an operation setting of the motor 32 in response to sensor data provided by the motion sensor arrangement 34. The portable food processing apparatus 10 may further comprise a sensor (not shown) for detecting the container 20 being correctly secured on the housing 30. The microcontroller 35 may be responsive to this sensor in that the microcontroller 35 can only activate the motor 32 if this sensor indicates that the container 20 is properly secured on the housing 30, thereby preventing accidental and potentially harmful exposure of the user of the portable food processing apparatus 10 to a rotating blade arrangement 22. Of course, such a sensor may be omitted where a safety lock mechanism ensures secure mounting of the container 20 on the housing 30.

The housing 30 may further comprise a user interface 36 communicatively coupled to the microcontroller 35 through which a mode of operation of the portable food processing apparatus 10 may be selected. For example, the user interface 36 may be used to enable or disable the motion control of the operating setting of the motor 32 with the microcontroller 35 in response to sensor data received from the motion sensor arrangement 34. The user interface 36 may take any suitable shape or form, and may comprise at least one of one or more buttons, knobs, dials, and so on. The user interface 36 further may comprise a sensory output device under control of the microcontroller 35 such as a buzzer, loudspeaker, a light source such a LED or the like, through which the microcontroller 35 may inform the user of a particular status of the portable food processing apparatus 10 through appropriate control of the sensory output device.

The housing 30 may further contain a direct current (DC) power source such as a battery 39 arranged to power the various electrical components of the portable food processing apparatus 10, such as the motor 32, the microcontroller 35 and the motion sensor arrangement 34. The housing 30 may comprise a removable lid (not shown) providing access to a compartment holding the battery 39, e.g. to allow replacement of the battery 39, and/or may have a charging port (not shown) through which the battery 39 may be recharged, e.g. a USB port or the like.

Figure 2:
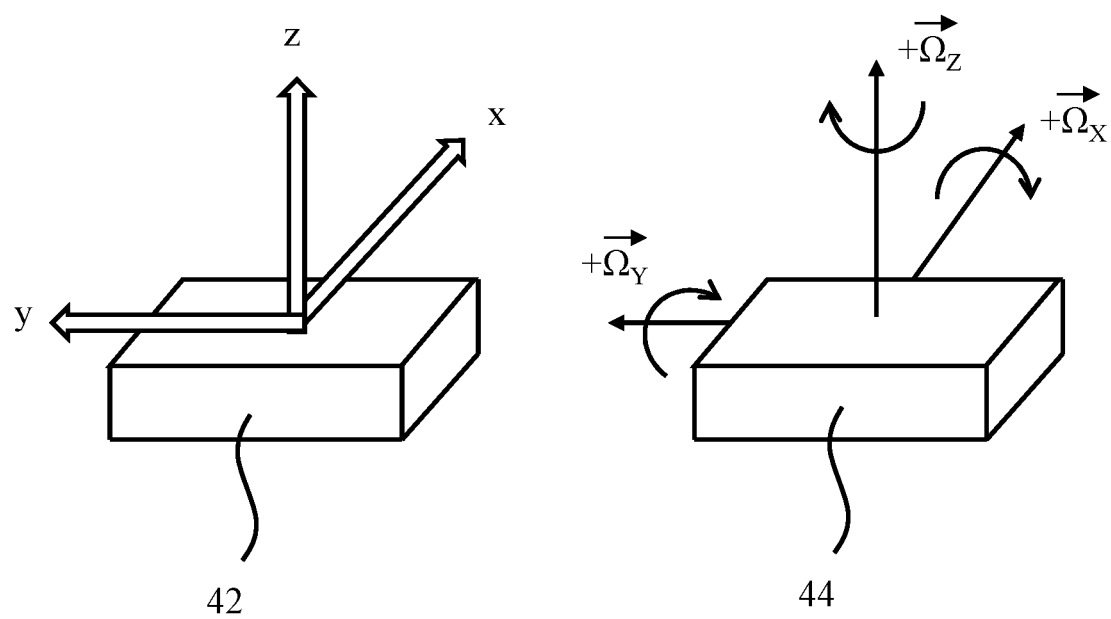
FIG. 2 schematically depicts a perspective view of an aspect of such a portable food processing apparatus.
Figure 3:
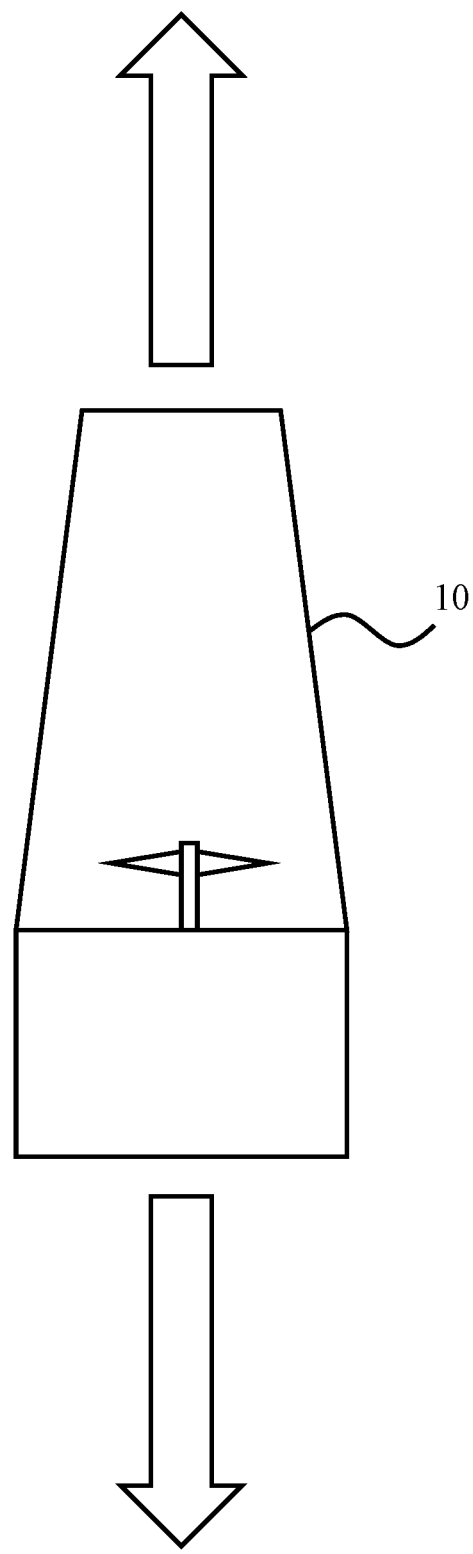
FIG. 3 schematically depicts an example motion pattern for controlling the inventive portable food processing apparatus.
Figure 4:
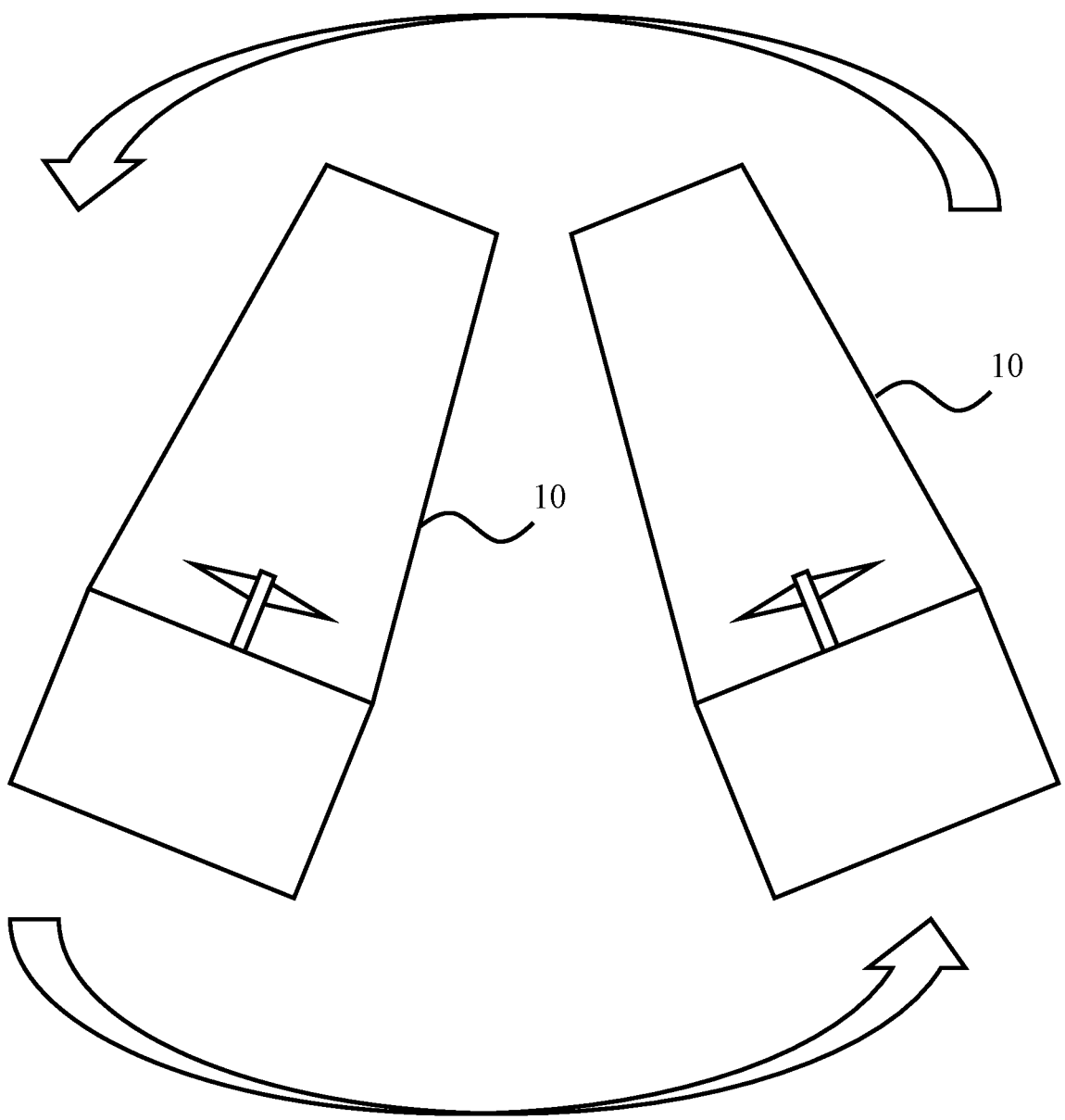
FIG. 4 schematically depicts another example motion pattern for controlling the inventive portable food processing apparatus.

FIG. 2 schematically depicts an example embodiment of the motion sensor arrangement 34. In this example embodiment, the motion sensor arrangement 34 comprises an accelerometer 42 and a gyroscope 44. It is reiterated that the motion sensor arrangement instead may comprise only an accelerometer 42 or a gyroscope 44. Other types of motion sensors and/or other configurations of the motion sensor arrangement 34 may also be contemplated. The accelerometer 42 is arranged to detect linear motion g(x, y, z) of the portable food processing apparatus 10 as schematically depicted in FIG. 3, whereas the gyroscope 44 is arranged to detect angular (rotational) motion Ω(X, Y, Z) of the portable food processing apparatus 10 as schematically depicted in FIG. 4.

The microcontroller 35 typically is arranged to evaluate sensor data produced by the motion sensor arrangement, which may involve evaluation of the magnitude of the linear and/or angular acceleration data produced by the accelerometer 42 and/or the gyroscope 44 by comparing each of these values against a defined threshold value, e.g. g0 or Ω0. As long as the detected linear and/or angular acceleration values do not exceed these thresholds, the microcontroller 35 will not commence motion pattern recognition. This for instance ensures avoidance of the inadvertent activation of the motion pattern recognition during transport of the portable food processing apparatus 10. However, as soon as one of the detected linear and/or angular acceleration values exceeds its defined threshold, the microcontroller 35 starts evaluating the sensor data provided by the motion sensor arrangement 34 in order to detect the generation of sensor data corresponding to a predefined motion pattern. Upon recognition of such a predefined motion pattern in the evaluated sensor data, the microcontroller 35 controls the motor 32 in accordance with an operation setting corresponding to the predefined motion pattern.

It is noted that the recognition of such a motion pattern in the sensor data by the microcontroller 35 typically requires the detection of a repetitive data pattern in the sensor data, as such repetition is typically caused by the repetition of a particular motion, e.g. shaking and/or twisting of the portable food processing apparatus 10. In addition or as an alternative to the evaluation of such a repetitive data pattern as a whole, characteristics of the repetition may be used to invoke an operation setting of the motor 32 with the microcontroller 35. For instance, where the motion pattern is a shaking motion, the nature of the shaking, e.g. slow or fast shaking, calm or vigorous shaking, typically leads to a different average acceleration of the portable food processor 10 as sensed with the motion sensor arrangement 34 and/or to a different repetition frequency of the data patterns acquired with the motion sensor arrangement 34, which may be leveraged to fine-tune the operation of the motor 32 by the microcontroller 35. For instance, the shaking may trigger the microcontroller 35 to activate the motor 32, whereas the intensity of the shaking, as quantified by average acceleration of the portable food processing apparatus 10 and/or the shaking frequency, may be used to set the rotation speed of the blade arrangement 22 with the motor 32, e.g. a light shaking of the portable food processing apparatus 10 will set the rotation speed of the blade arrangement 22 to a fraction of its full rotation speed, e.g. 50%, 80% or the like, whereas a vigorous shaking of the of the portable food processing apparatus 10 will set the rotation speed of the blade arrangement 22 to its full rotation speed. As will be readily understood by the skilled person, this for instance may be realized by controlling the amount of power delivered to the motor 32 with the microcontroller 35. Similarly, the setting of the duration of the motor operation may be controlled by such motion patterns.

In an example embodiment, the microcontroller 35 may compare the determined average acceleration of the portable food processing apparatus 10 and/or the shaking frequency of the portable food processing apparatus 10 against a lower and higher threshold. If the average acceleration of the portable food processing apparatus 10 and/or the shaking frequency of the portable food processing apparatus 10 is below the lower threshold, no predetermined motion pattern has been recognized in the received sensor data. If the average acceleration of the portable food processing apparatus 10 and/or the shaking frequency of the portable food processing apparatus 10 is above the higher threshold, the motor 32 will be engaged at full power to deliver maximum rotation speed of the blade arrangement 22. Finally, if the average acceleration of the portable food processing apparatus 10 and/or the shaking frequency of the portable food processing apparatus 10 lies between the lower threshold and the higher threshold, the motor 32 will be engaged at reduced power to deliver throttled down rotation speed of the blade arrangement 22. This throttled down rotation speed of the blade arrangement 22 may be a fixed speed or may be proportional to the determined average acceleration of the portable food processing apparatus 10 and/or the shaking frequency of the portable food processing apparatus 10. Hence, such a motion pattern can be used to activate the motor 32 and set its power at the same time. Similarly, such motion pattern information may be used to control, e.g. adjust, the power supplied to the motor 32 after its activation in any suitable manner. For example, once the motor 32 has been activated, e.g. for a defined period of time as will be explained in more detail below, the detection of a predetermined motion pattern, in particular the average acceleration of the portable food processing apparatus 10 and/or the shaking frequency of the portable food processing apparatus 10 may be used to adjust the rotation speed of the (already rotating) blade arrangement 22.

The microcontroller 35 further may be adapted to determine a change to the rotation speed of the blade arrangement 22, i.e. the power supplied to the motor 32, based on a change between the previously determined average acceleration of the portable food processing apparatus 10 and/or shaking frequency of the portable food processing apparatus 10 and the latest determined average acceleration of the portable food processing apparatus 10 and/or shaking frequency of the portable food processing apparatus 10. If this change is negative, i.e. the latest determined average acceleration of the portable food processing apparatus 10 and/or shaking frequency of the portable food processing apparatus 10 is smaller than the previously determined average acceleration of the portable food processing apparatus 10 and/or shaking frequency of the portable food processing apparatus 10, such a negative change, e.g. caused by less vigorous shaking, may be interpreted by the microcontroller 35 as an instruction to reduce the rotation speed of the blade arrangement 22, whereas a positive change may be interpreted by the microcontroller 35 as an instruction to increase the rotation speed of the blade arrangement 22.

In an alternative embodiment, the rotation speed of the blade arrangement 22, i.e. the amount of power to be delivered to the motor 32, may be controlled by detection of a change in the orientation of the portable food processing apparatus 10, more specifically its tilt angle. As will be understood by the skilled person, such changes in tilt angle may be detected with an accelerometer 42 or with a gyroscope 44 for instance. For example, assuming a tilt angle θ of a vertical axis (when θ=0°) of the portable food processing apparatus 10 relative to a horizontal plane, changes in this tilt angle may be used to adjust the rotation speed of the blade arrangement 22 accordingly. For instance, an increase in the tilt angle θ may cause the rotation speed of the blade arrangement 22 to be reduced accordingly. Such a change in the rotation speed of the blade arrangement 22 may be proportional to the value of the tilt angle θ or may be incremental, e.g. the rotation speed of the blade arrangement 22 may be altered when the tilt angle θ adopts a value within a range of values corresponding to a particular rotation speed setting of the blade arrangement 22. In a variation, the rotation speed of the motor 32 may be adjusted by the microcontroller 35 upon the microcontroller 35 detecting a twisting motion in the sensor data from the motion sensor arrangement 34, e.g. from the gyroscope 44. This could be a twisting motion around a horizontal or vertical axis for instance. Such a twisting motion alternatively may be used to inverse the rotation direction of the motor 32, e.g. from clockwise to counter-clockwise or vice versa, in case of a brushless motor 32.

Figure 5:
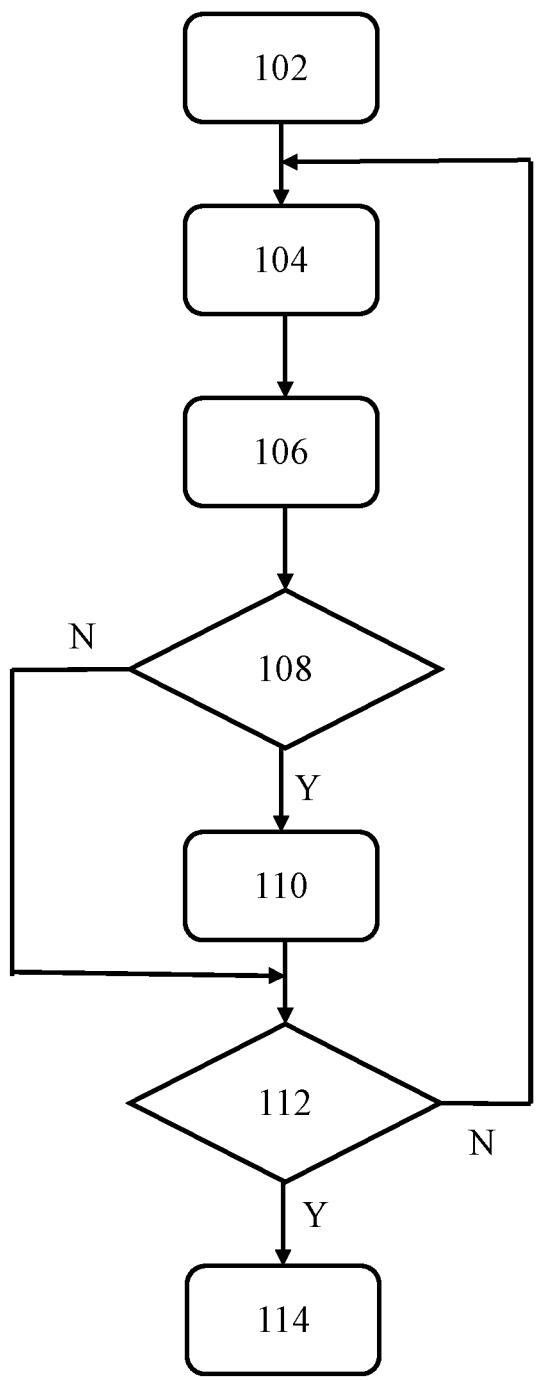
FIG. 5 is a flowchart of a method of controlling a (portable) food processing apparatus.

FIG. 5 is a flowchart of method 100 for controlling a portable food processing apparatus 10 in accordance with embodiments of the present invention. The method 100 starts in operation 102, in which a user activates the operation setting selection mode by means of predetermined motion pattern recognition as previously explained. This activation for example may be done through the user interface 36, e.g. by pressing an appropriate button or switch or the like or by detection of the container 20 being secured against the housing 30 with the microcontroller 35. This triggers the microcontroller 35 to look out for data patterns in the output of the motion sensor arrangement 34 that are caused by predetermined motion patterns corresponding to defined control instructions of the portable food processing apparatus 10, i.e. instructions for initiating or altering an operation setting of the motor 32. Alternatively, the microprocessor 35 may start looking out for such data patterns in the output of the motion sensor arrangement 34 upon detecting the portable food processing apparatus 10 being placed or held in a particular orientation, thereby obviating the need for an activation command using the user interface 36.

In operation 104, the microcontroller 35 receives the sensor data from the motion sensor arrangement 34 and evaluates the sensor data in operation 106. It is noted that operations 104 and 106 may be performed substantially simultaneously, e.g. in a moving window fashion using real-time processing. If this evaluation uncovers a match between a sensor data pattern in the actual sensor data and a defined sensor data pattern corresponding to a predetermined motion pattern, as indicated by checking operation 108, e.g. using an algorithm in which the sensor data definitions are incorporated to perform this evaluation, the microcontroller 35 proceeds to operation 110 in which an operating setting of the motor 32 corresponding to this predetermined motion pattern is invoked by the microcontroller 35 prior to proceeding to operation 112. On the other hand, if the result of the checking operation 108 is negative, i.e. the received sensor data does not match any sensor data pattern corresponding to a predetermined motion pattern, e.g. as defined within the aforementioned algorithm, or no sensor data exceeding the threshold g0 and/or Ω0 has been received in operation 104, the microcontroller 35 may immediately proceed to operation 112 as no control instruction has been recognized in the received sensor data.

In operation 112, the microcontroller 35 determines whether the operating mode of the portable food processing apparatus 10 in which the portable food processing apparatus 10 may be controlled using motion patterns, can be terminated. In an embodiment, upon activation of the motor 32 in operation 110, the motor 32 may be activated for a set initial period of time $T_i$, e.g. a period of about 10-30s or any other suitable time period. The microcontroller may check in operation 112 if the time period $T_i$ has lapsed, and if this is the case disengage the motor 32 of the portable food processing apparatus 10 in operation 114, or if this is not the case, return to operation 104 to continue reception and evaluation of sensor data, e.g. to determine if the operation setting of the motor 32 is to be altered in accordance with a recognized motion or motion pattern.

During the period $T_i$, the user may move the portable food processing apparatus 10 in a predetermined manner in order to extend time period $T_i$ by a set amount Δ, i.e. actual duration $T_a$ of the motion pattern control mode of the portable food processing apparatus 10 becomes $T_a=T_i+\Delta$. To this end, the microcontroller 35 may recognize the sensor data corresponding to this particular motion or motion pattern to extend the duration of the motor operation in operation 108 from $T_i$ to $T_a$. The microcontroller may further count the number of times the user has extended the operating time of the motor 32 in this manner, and cap the number of times such an extension instruction will be executed, e.g. cap the number of such extensions within a single operating period of the motor 32 to ten for example. This way, the motor 32 for example can be protected from overheating by a user trying to keep the motor 32 active for too long. This also protects the battery 39 from rapid depletion, as well as protects food within the food processing chamber 21 from being over-processed.

Furthermore, whilst the initial activation period $T_i$ has not yet expired, the microcontroller 35 may stay responsive to the sensor data produced by the sensor arrangement 34 even if the motor 32 has been disengaged for some reason, as long as the container 20 remains secured on the housing 30. For example, the microcontroller 35 may stay responsive for the remainder of the initial activation period $T_i$, or for a fixed time period, e.g. 10s or another suitable fixed duration. This way the motor 32 may be re-engaged by the microcontroller 32 upon recognizing a predetermined motion pattern in the sensor data corresponding to an operation setting of the motor 32. It is noted that the motion control mode of the portable food processing apparatus 10 equally may be active for a defined period of time, starting from its activation and/or receipt of sensor data corresponding to a valid predetermined motion pattern, and that this motion control mode is deactivated upon the microcontroller 35 not receiving a (further) sensor data pattern corresponding to a predetermined motion pattern during this period of time. This ensures that the motor 32 cannot be accidentally engaged by the microcontroller 35 beyond this period of time, e.g. when the portable food processing apparatus 10 is in transit.

In a further refinement, the microcontroller 35 during operation of the motor 32 may be configured to determine the movement direction of the portable food processing apparatus 10 from the sensor data provided by the motion sensor arrangement 34 and control the operation setting of the motor 32 accordingly once the motor 32 has been activated. For instance, when the portable food processing apparatus 10 is moved downwardly, i.e. towards the ground, forces acting upon the food product(s) within the food processing chamber 21 may push the food upwardly and away from the blade arrangement 20, whereas when the portable food processing apparatus 10 is moved upwardly, i.e. away from the ground, forces acting upon the food product(s) within the food processing chamber 21 may push the food downwardly and towards the blade arrangement 20.

Hence, upon detection of a motion of the portable food processing apparatus 10 in the sensor data provided by the sensor arrangement 34, i.e. accelerometer 42 and/or gyroscope 44, indicative of food being pushed away from the blade arrangement 22, the microcontroller 35 may adjust the operation setting of the motor 32 accordingly, e.g. by reducing the power being supplied to the motor 32, thereby reducing the rotation speed of the blade arrangement 22 to compensate for this effect. Similarly, upon detection of a motion of the portable food processing apparatus 10 in the sensor data provided by the sensor arrangement 34, i.e. accelerometer 42 and/or gyroscope 44, indicative of food being pushed towards the blade arrangement 22, the microcontroller 35 may adjust the operation setting of the motor 32 accordingly, e.g. by increasing the power being supplied to the motor 32 such as restoring full power to the motor 32, thereby increasing the rotation speed of the blade arrangement 22 to compensate for this effect. In this manner, the rotation speed of the blade arrangement 22 may be automatically matched to the amount of food in the vicinity of the blade arrangement, which ensures good control over how the food product(s) are processed overall.

Figure 6:
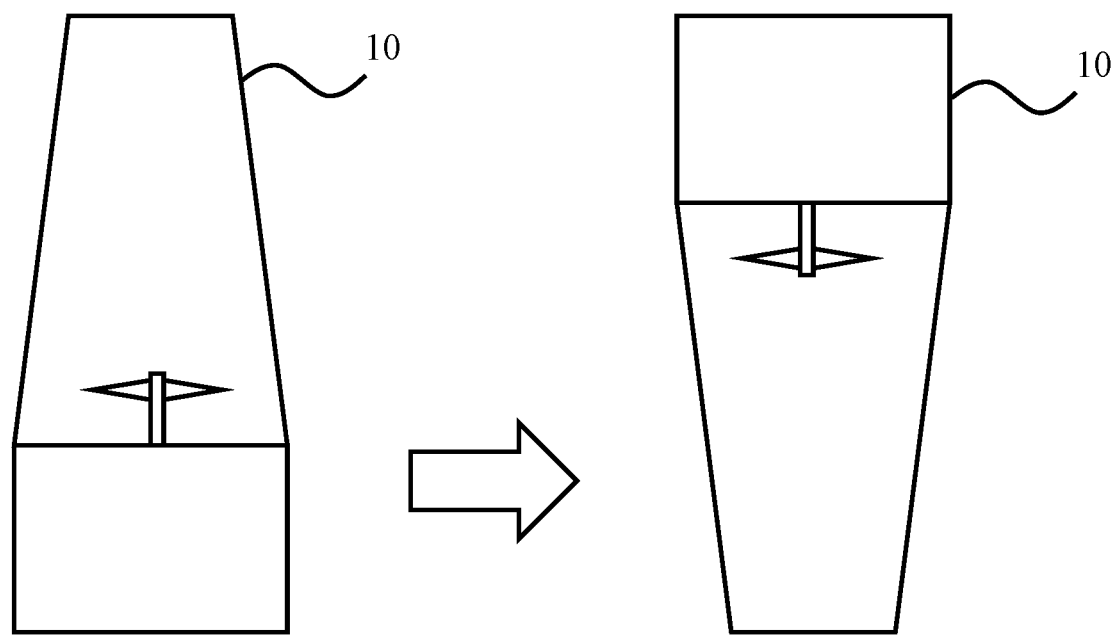
FIG. 6 schematically depicts an example motion for terminating operation of the inventive portable food processing apparatus.

In an embodiment, the microprocessor 35 of the portable food processing apparatus is further adapted to terminate the power supplied to the motor 32, i.e. switch off the motor 32, when certain conditions are met. FIG. 6 schematically depicts a user-controlled motion of the portable food processing apparatus 10 in which the user turns the portable food processing apparatus 10 upside down in order to terminate the processing of the food within the food processing chamber 21 by switching off the motor 32. The upside down orientation of the portable food processing apparatus 10 may be detected by the microcontroller 35 in the sensor data provided by the motion sensor arrangement 34 and recognized as a predetermined motion for terminating the operation of the motor 32. Of course, any discernible predetermined motion may be used for this purpose. For example, the microcontroller 35 may pause or terminate the operation of the motor 32 upon detecting the portable food processing apparatus 10 being kept in a tilted orientation beyond a critical tilt angle.

Figure 7:
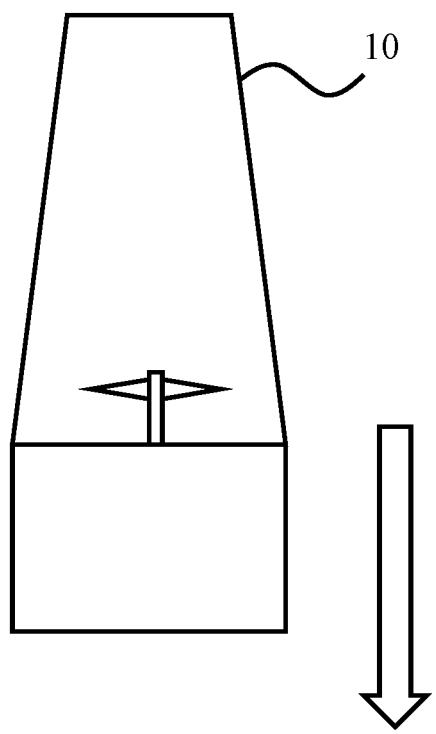
FIG. 7 schematically depicts another example motion for terminating operation of the inventive portable food processing apparatus.

FIG. 7 schematically depicts the portable food processing apparatus 10 in freefall, e.g. because the user has accidentally dropped the portable food processing apparatus 10. Such a freefall can be detected by the microcontroller 35 in the sensor data provided by the motion sensor arrangement 22, e.g. by establishing a continuous downward motion exceeding a defined duration threshold, upon which the microcontroller 35 switches off the motor 32. In such a scenario, the portable food processing apparatus 10 may be configured such that the motor 32 can only be re-engaged using the user interface 36 or a switch or sensor indicating that the container 20 is secured against the housing 30.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A portable food processing apparatus comprising:
    a food processing chamber including a blade arrangement; and
    a housing comprising: a motor for driving said blade arrangement, a microcontroller for controlling said motor, and at least one motion sensor communicatively coupled to said microcontroller;
    wherein the microcontroller is adapted to:
    evaluate a sensor data produced by the at least one motion sensor in order to detect a predefined motion pattern in said sensor data and said predefined motion pattern corresponding to an operation setting of the motor; and
    control said motor in accordance with said operation setting upon detection of the predefined motion pattern.

2. The portable food processing apparatus of claim 1, wherein the microcontroller is adapted to determine an average acceleration or a frequency of the detected predefined motion pattern within the evaluated sensor data and said operation setting is a function of the determined average acceleration or the frequency.

3. The portable food processing apparatus of claim 1, wherein the microcontroller is adapted to engage the motor for a predefined period of time in response to the detection of the predefined motion pattern corresponding to an activation command for said motor.

4. The portable food processing apparatus of claim 3, wherein the predefined motion pattern corresponding to said activation command is a repetitive shaking of the portable food processing apparatus.

5. The portable food processing apparatus of claim 3, wherein the microcontroller is adapted to extend said predefined period of time upon the detection of the predefined motion pattern corresponding to an activation extension command.

6. The portable food processing apparatus of claim 5, wherein the microcontroller is adapted to limit a number of times said predefined period of time is extended upon the detection of the predefined motion pattern corresponding to the activation extension command.

7. The portable food processing apparatus of claim 1, wherein said operation setting is a setting of a rotation speed or a rotation direction of the blade arrangement with said motor.

8. The portable food processing apparatus of claim 7, wherein the microcontroller is adapted to:
 evaluate the sensor data produced by the at least one motion sensor in order to detect a change in a tilt angle of the portable food processing apparatus in said sensor data; and
 control the motor to adjust the rotation speed of the blade arrangement in accordance with the detected change in said tilt angle.

9. The portable food processing apparatus of claim 7, wherein the microcontroller is adapted to:
 determine a direction of travel of the portable food processing apparatus from the sensor data received during operation of the blade arrangement; and
 control the motor to adjust the rotation speed of the blade arrangement in accordance with the determined direction of travel.

10. The portable food processing apparatus of claim 9, wherein the microcontroller further is adapted to control the motor to terminate the operation of the blade arrangement in response to the sensor data indicating an orientation or a motion of the portable food processing apparatus for a defined duration of time.

11. The portable food processing apparatus of claim 1, further comprising a battery arranged to power the at least one motion sensor, the microcontroller, and the motor.

12. The portable food processing apparatus of claim 1, wherein the at least one motion sensor comprises at least one of an accelerometer and a gyroscope.

13. The portable food processing apparatus of claim 1, wherein the portable food processing apparatus is a portable blender.

14. The portable food processing apparatus of claim 1 comprises a container detachably mounted on the housing using a mounting mechanism.

15. The portable food processing apparatus of claim 2, wherein when the average acceleration and/or the frequency is below a lower threshold, the predetermined motion pattern is not detected in said sensor data.

16. The portable food processing apparatus of claim 2, wherein when the average acceleration and/or the frequency is above a higher threshold, the motor is engaged at full power to deliver a maximum rotation speed of the blade arrangement.

17. The portable food processing apparatus of claim 2, wherein when the average acceleration and/or the frequency lies between the lower threshold and the higher threshold, the motor is engaged at a reduced power to deliver throttled down rotation speed of the blade arrangement.

* * * * *